April 28, 1970     H. DURRER     3,508,527
APPARATUS FOR SEPARATING WATER FROM WET STEAM
Filed Sept. 23, 1968     3 Sheets-Sheet 1

Inventor:
HERMANN DURRER
BY
ATTORNEYS

April 28, 1970     H. DURRER     3,508,527

APPARATUS FOR SEPARATING WATER FROM WET STEAM

Filed Sept. 23, 1968     3 Sheets-Sheet 2

Inventor:
HERMANN DURRER

United States Patent Office 3,508,527
Patented Apr. 28, 1970

3,508,527
APPARATUS FOR SEPARATING WATER FROM WET STEAM
Hermann Durrer, Winterthur, Switzerland, assignor to Sulzer Brothers, Ltd., Winterthur, Switzerland, a corporation of Switzerland
Filed Sept. 23, 1968, Ser. No. 761,540
Claims priority, application Switzerland, Sept. 21, 1967, 13,231/67
Int. Cl. F22g 5/16; F22b 37/26
U.S. Cl. 122—483  9 Claims

ABSTRACT OF THE DISCLOSURE

The water separator elements are arranged in discrete passageways to separate the water from the wet steam while the superheater tubes are similarly subdivided into the passageways. Further, the cross-sectional areas of the flow passageways taken across the water separator elements and superheater tubes remain in a constant ratio to obtain a uniform distribution of the flow.

---

Figure 1:
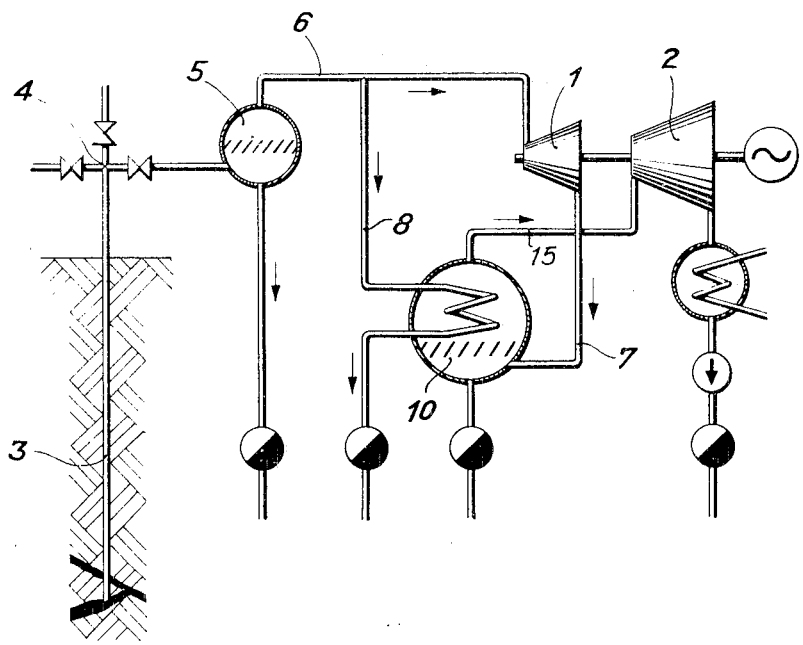

This invention relates to an apparatus for separating water from wet steam. More particularly, this invention relates to an apparatus for separating water from a flow of wet steam in steam power plants.

Heretofore, water separators have been known, for example, for use in steam power plants, such as geothermal power plants, in which high-pressure saturated steam is partially expanded in a high-pressure stage of a prime mover. After expansion in such plants, such steam has been freed of water droplets by the water separators and then superheated by means of the high-pressure saturated steam flow before being fed to a second pressure stage of the prime mover. In some instances, the water separators have been formed with a mass of metal filaments such as steel wool or steel shavings, or a fabric formed of such filaments.

However, these known water separators when used, for example, in the above steam power plants, have in many cases not obtained an efficient separating effect since the flow speed of the steam through the filter-like water separators has been excessive rather than moderate.

Accordingly, it is an object of the invention to control the flow speed of wet steam through a water separator.

It is another object of the invention to improve the separating effects of water separators in steam plants.

It is another object of the invention to avoid excessive flow speeds of a wet steam through a water separator.

It is another object of the invention to uniformly distribute a flow of wet steam through a plurality of water separators in a steam power plant.

Briefly, the invention provides an apparatus for separating water from wet steam intended for subsequent superheating wherein the wet steam is uniformly distributed in passing through a filter-like water separator. The apparatus includes a vessel which houses the water separator and a superheater downstream of the water separator in the direction of steam flow. Further, the space between the water separator and superheater is subdivided into a plurality of flow passages for the steam flow with each passage interconnecting parts of the total flow passages through the water separator and superheater of cross-sectional areas which are in approximately the same ratio as the cross-sectional areas of the total flow passage through the separator and superheater. With this arrangement, the distribution of flow through the various parts of the water separator is approximately uniform. Consequently, the flow speed through the various parts of the water separator is approximately uniform with little risk of excessive speeds of flow in one part with correspondingly lower speeds in other parts.

In one embodiment of the invention, the vessel is cylindrical and the water separator and superheater are formed of elements and tube bundles, respectively, which run substantially parallel to the longitudinal axis of the vessel. Further, the individual flow passages for the wet steam between the water separator elements and superheater are bounded by partitions which run substantially perpendicular to the longitudinal axis of the vessel. An even distribution of the steam flow through the separator elements is thus obtained along the length of the vessel. This is of importance, especially with long cylindrical vessels and in vessels having the stem inlets and outlets in the end walls.

Where an apparatus has a plurality of water separator elements arranged in a plurality of layers, partitions are also provided which run parallel to the longitudinal axis of the vessel to direct the steam flow through the different layers.

Further, the partitions can be continued through the superheater to subdivide the tube bundles in order to improve the regulating effect of the flow resistance of the superheater on the various flows of steam.

Figure 2:
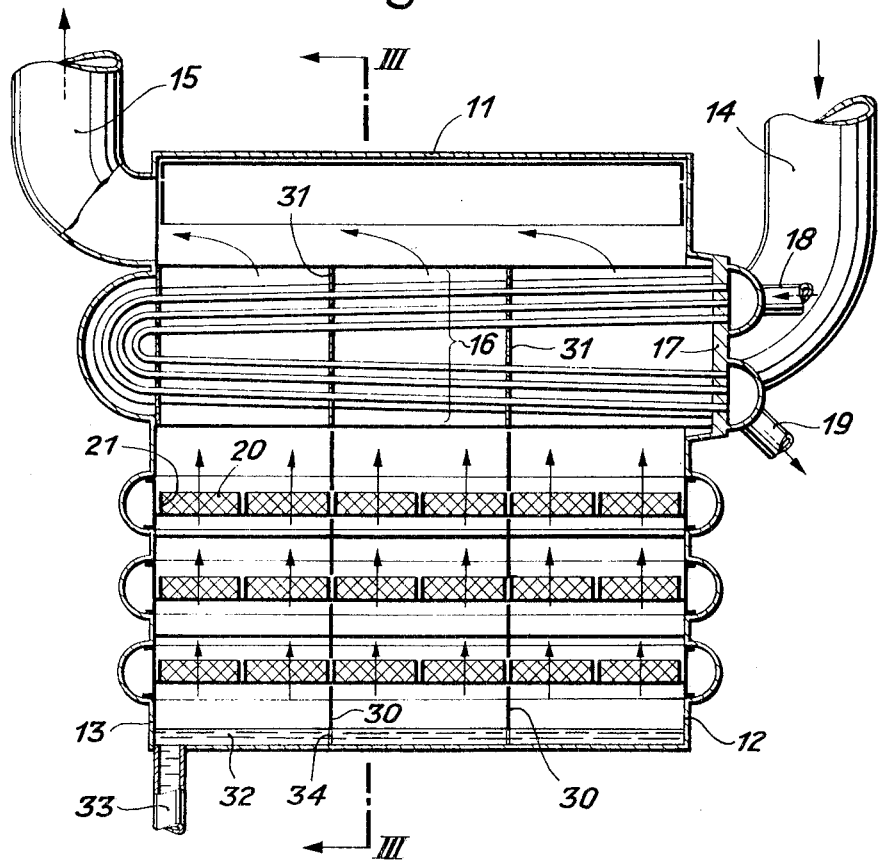
Figure 3:
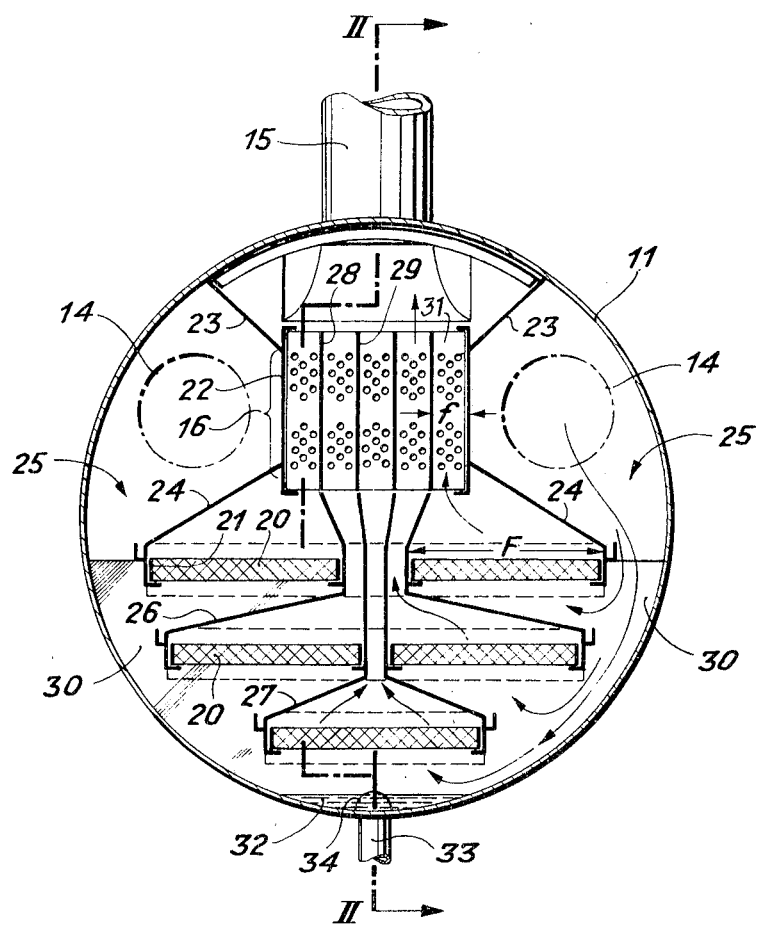

These and other objects and advantages of the invention will become more apparent from the following detailed description and appended claims taken in conjunction with the accompanying drawings in which:

FIG. 1 schematicaly illustrates a geothermal steam power plant utilizing an apparatus of the invention;

FIG. 2 illustrates a view taken on line II—II of FIG. 3 of an apparatus of the invention; and FIG. 3 illustrates a view taken on line III—III of FIG. 2.

Referring to FIG. 1, the steam power plant consists of high-pressure and low-pressure turbines 1, 2 in which steam a subterranean source is used. Wet steam which is collected under the ground by means of a pipe 3 passes by way of a distributing cross 4 into a saturated-steam separator 5 in which the steam is dried. The steam then flows along a pipe 6 into the high-pressure turbine 1. After being partially expanded in the high-pressure turbine 1, the steam flows along a pipe 7 into an apparatus 10 in which this steam is freed of entrained water droplets and then superheated using high-pressure saturated steam diverted along a pipe 8 from the pipe 6. The partially expanded steam is then fed via an outlet pipe 15 to the low-pressure turbine 2 to do work.

Referring to FIGS. 2 and 3, the apparatus 10 includes a cylindrical vessel 11 with end walls 12, 13. One end wall 12 contains two inlet pipes 14 for the introduction of wet steam from pipe 7 (not shown) and the other end wall 13 contains one outlet pipe 15. Inside the vessel 11, bundles of tubes forming a superheater 16 are attached to a tube plate 17 supported in the inlet end wall 12. This tube plate 17 is provided with pipes 18, 19 for supplying and discharging the high-pressure steam for superheating delivered via pipe 8. Below the superheater 16, elements 20 of a water separator are arranged in a plurality of superjacent layers. The elements 20 are tray-like and contain a filter-like mass of metal filaments held in suitable frames 21. The filter-like mass in the frames 21 can be formed in the manner of conventional steel wool or steel shavings or can be a fabric.

Referring to FIG. 3, partitions 22 are disposed longitudinally of the vessel 11 at the sides of the bundles of tubes in the superheater 16 and are joined to partitions 23, 24 inclined from the plane of the partitions 22. The upper inclined partitions 23 define a flow passage therebetween which is connected to the outlet pipe 15 while the partitions 22, 23, 24 togther define a spaced pair of lateral inlet chambers 25 which are connected to the inlet pipes 14. Additionally, partitions 26, 27 are disposed longitudinally of the vessel 11 between the two lower lateral partitions 24 to guide the steam during flow through the various layers of separator elements 20. These partitions 26, 27 are adjoined by vertically disposed partitions 28, 29 which pass between the various bundles of tubes in the superheater 16.

Referring to FIG. 2, partitions 30 are disposed in spaced parallel relation within the vessel 11 to extend transversely to the cylinder axis of the vessel 11 in order to subdivide the chamber containing the water separator elements and are adjoined by transverse partitions 31 in the superheater 16 which similarly subdivides the tube bundles. The bottom of the vessel 11 contains a water space 32 which collects separated water and from which water is discharged through a discharge pipe 33. In order to enable the separated water to drain away, connecting apertures 34 are arranged in the bottom of the partitions 30.

Referring to FIG. 3, the partitions 24, 26, 27 and 22, 28, 29 and also the transverse partitions 31, are arranged to form passages which connect parts of the flow passage through the separator 20 to parts of the flow passage through the superheater 16. Further, these parts have cross-sectional areas which are in approximately the same ratio as the cross-sectional areas of the total flow passages through the separator and superheater. The ratio of the widths $F/f$ of such parts is the same for all passages having the same length in the axial direction along the vessel 11 and is equal to the ratio of the total flow cross-sections of the separator and superheater.

During operation, the wet steam which is to be dried and superheated is fed to the apparatus 10 through the pipes 14 and enters the passages 25. From these passages 25 the steam flows through the various filter elements 20 to have the entrained water removed and thence passes along the passages formed between the partitions 24, 26, 27, 30 to the tube bundles in the superheater 16. In the superheater, the dried steam flows through the communicating passages formed by the partitions 22, 28, 29 and 31 and the end walls of the vessel and is superheated by a heat exchange with the medium flowing through the tube bundles. The superheated steam is then discharged downstream of the superheater through the pipe 15.

It is noted that the filter elements of the water separator have a relatively low flow resistance, whereas the superheater, which is shown only diagrammatically in the drawings, has a considerably higher flow resistance. Since the various parts of the flow passage through the separator are connected to parts of the flow passage through the superheater in such a way that the passages connect flow cross-section areas of the separator and superheater which are proportional to the total flow cross-section areas of the separator and superheater, the greater flow resistance of the superheater is exploited in order to distribute the flow of steam through the water separater more uniformly. That is, as the flow of steam spreads evenly over the greater flow resistance of the superheater, the flow through the various separator elements is also necessarily evenly spread. The flow speed of the steam is thus easily controlled in passing through the water separator elements while being maintained substantially uniform in the separator elements.

Obviously, depending on the construction of the apparatus and, in particular, the shape of the vessel, the partitions 30 perpendicular to the cylinder axis of the vessel 11 and the partitions 24, 26, 27 parallel to this axis can be used either alone or in combination. Further, the shape of the partitions may be other than that illustrated, e.g. curved. The tray-like separator elements, instead of being horizontal as illustrated, can also incline, preferably outwards.

What is claimed is:
1. An apparatus for separating water from wet steam comprising
   a vessel for passage of a flow of steam therethrough;
   a filter-like water separator disposed in said vessel in the flow of steam;
   a superheater in said vessel in the flow of steam downstream of said water separator; and
   means between said water separator and superheater defining a plurality of flow passages for the flow of steam therebetween, each of said flow passages interconnecting parts of the total flow passages through said water separator and said superheater of cross-sectional areas in approximately the same ratio as the cross-sectional areas of the total flow passages through said water separator and said superheater.

2. An apparatus as set forth in claim 1 wherein said vessel is cylindrical and said water separator and superheater are disposed parallel to the longitudinal axis of said vessel.

3. An apparatus as set forth in claim 2 wherein said means includes a plurality of partition walls disposed perpendicularly of said longitudinal axis of said vessel to define said flow passages.

4. An apparatus as set forth in claim 3 wherein said means further includes partition walls perpendicular to said water separator and superheater in spaced parallel relation along said longitudinal axis of said vessel.

5. An apparatus as set forth in claim 4 wherein at least some of said partition walls extend through said superheater.

6. An apparatus as set forth in claim 2 wherein said water separator includes a plurality of elements arranged in a plurality of spaced layers, and said means includes partition walls extending parallel to said longitudinal axis of said vessel to direct the steam flow through each respective layer.

7. An apparatus as set forth in claim 6 wherein at least some of said partition walls extend through said superheater.

8. An apparatus as set forth in claim 1 wherein said vessel has a pair of longitudinally spaced end walls, one of said end walls having inlet means upstream of said water separator for introduction of the flow of wet stream, the other of said end walls having outlet means downstream of said superheater for egress of a flow of dry steam.

9. An apparatus as set forth in claim 8 wherein said water separator for introduction of the flow of wet steam, nally between said end walls whereby the flow of steam is directed substantially transversely of said water separator and superheater.

References Cited

FOREIGN PATENTS 931,235  7/1963  Great Britain.

KENNETH W. SPRAGUE, Primary Examiner

U.S. Cl. X.R.

122—488

UNITED STATES PATENT OFFICE
CERTIFICATE OF CORRECTION

Patent No. 3,508,527  Dated April 28, 1970

Inventor(s) Hermann Durrer

It is certified that error appears in the above-identified patent and that said Letters Patent are hereby corrected as shown below:

Column 1, line 64, "tthe" should read -- the --. Column 2, line 14, "stem" should read -- steam --; line 29, "schematicaly" should read -- schematically --; line 37, after "steam" insert -- from --. Column 4, line 2, "for introduction of the flow of wet steam" should read -- and superheater are disposed longitudi --.

Signed and sealed this 1st day of September 1970.

(SEAL)
Attest:

EDWARD M. FLETCHER, JR.
Attesting Officer

WILLIAM E. SCHUYLER, JR.
Commissioner of Patents